Figure 1:
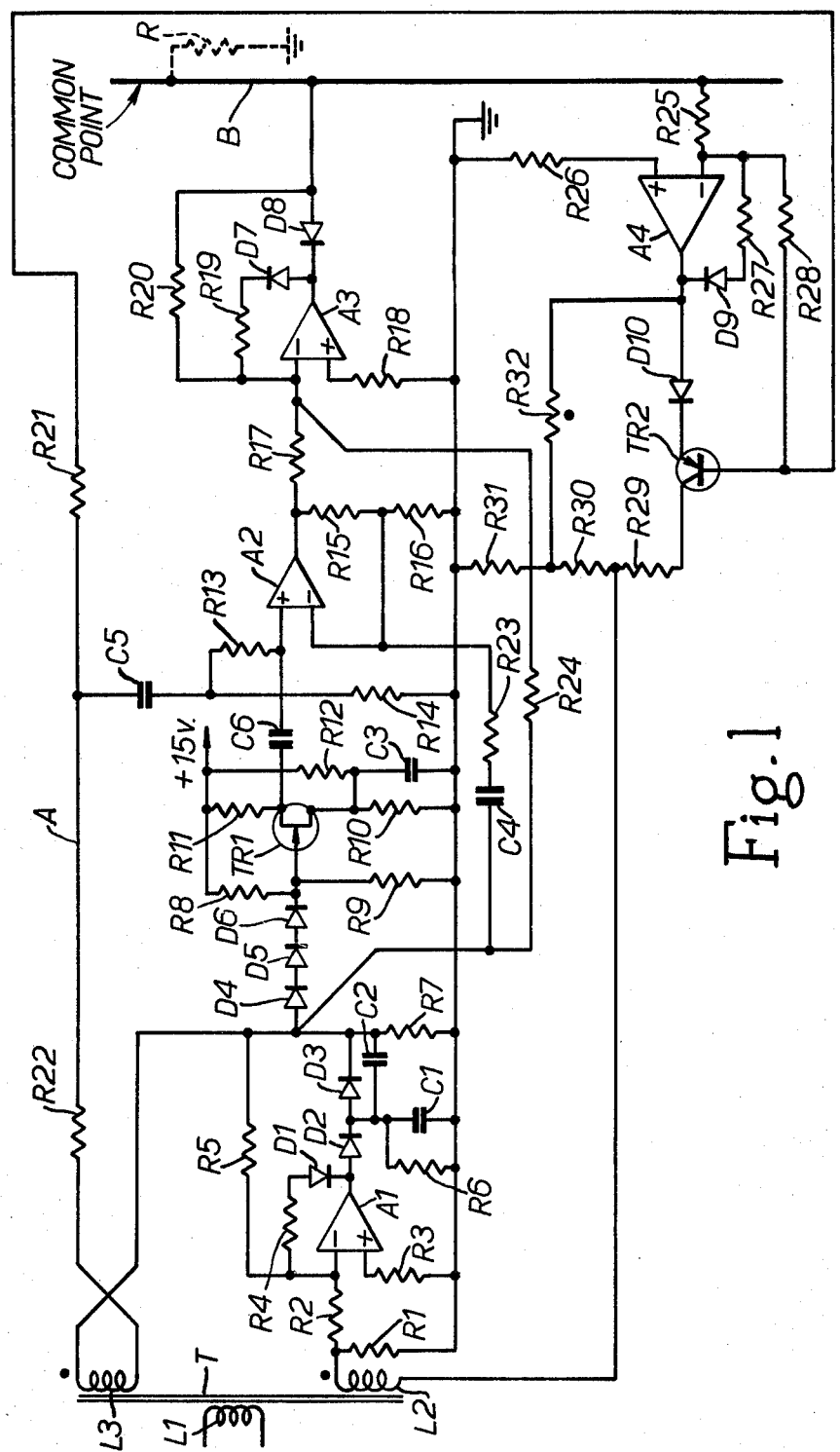

United States Patent [19]
Jones et al.

[11] 4,085,290
[45] Apr. 18, 1978

[54] TELEPHONE CONFERENCE AMPLIFIER

[75] Inventors: Ralph Archibald Jones, London, England; Allan Mathieson Drew, Glasgow, Scotland

[73] Assignee: Post Office, London, England

[21] Appl. No.: 739,975

[22] Filed: Nov. 8, 1976

[30] Foreign Application Priority Data

Nov. 17, 1975 United Kingdom .............. 47251/75

[51] Int. Cl.² ...................... H04M 3/56; H01L 23/56
[52] U.S. Cl. .................. 179/1. CN; 307/310
[58] Field of Search ............... 179/1 CN, 1 H, 1 VC, 179/1 VL, 1 HF; 307/310

[56] References Cited

U.S. PATENT DOCUMENTS

| | | | |
|---|---|---|---|
| 3,299,296 | 1/1967 | Bullene | 307/310 |
| 3,321,581 | 5/1967 | Zyrd | 179/1 VC |
| 3,371,231 | 2/1968 | Burley | 307/310 |
| 3,816,917 | 6/1974 | Jones | 179/1 CN |
| 3,943,286 | 3/1976 | Tsurushima | 179/1. VL |

OTHER PUBLICATIONS

"Transistor Manual," General Electric Co., 1969, pp. 106–107.

Primary Examiner—Kathleen H. Claffy
Assistant Examiner—Kenneth A. Chayt
Attorney, Agent, or Firm—Hall & Houghton

[57] ABSTRACT

A telephone conference amplifier consists of a plurality of identical channels connected to a common point. Each channel includes means for deriving an envelope signal from an incoming speech signal, and means for adding the envelope signal to the incoming signal to produce a unidirectional polarity signal which is applied through an ideal diode circuit to the common point. The signal at the common point is picked off by another ideal diode circuit in each channel and returned to the channel input. Each channel includes means for inhibiting the return of the signal when it is active. Each channel includes a level control circuit for controlling in dependence on the envelope signal the amplitude of the unidirectional polarity signal produced from an input signal so as to limit the range of variation. The sensitivity of the means for producing an envelope signal is responsive to the signal derived from the common point in such a way as to be reduced when the signal at the common point originates from another channel. The signal for reducing the sensitivity of the means for producing an envelope signal includes a transistor which is shunted by a temperature dependent resistor thereby to keep the reduction in sensitivity of the means for producing an envelope signal less dependent on temperature.

13 Claims, 2 Drawing Figures

TELEPHONE CONFERENCE AMPLIFIER

This invention relates to a telephone conference amplifier.

One form of telephone conference amplifier has been described in U.S. Pat. Specif. No. 3,816,917, and includes a number of channels, each for a respective participant talking at a telephone conference, the channels being connected to a common point to which signals from all participants are applied and from which signals are returned to the participants. It is desirable in such an amplifier to ensure that when a particular channel is active, that is to say the participant is speaking, the signals from that channel are applied to the common point for transmission to the other participants over their channels, but that spurious signals from inactive channels, for example due to rustling of papers, should be prevented from reaching the common point and disturbing the concentration of those listening to the speaker. In the above-mentioned patent specification a signal from the active channel applied to the common point raises a threshold to be overcome by signals from the other channels before they can be applied to the common point, but this threshold is not effective on the active channel.

It is more desirable that the participant talking (i.e. the talker) on the active channel should not have his voice relayed to him by his channel from the common point, and in the above patent specification the circuit is arranged so that there is little or no signal returned from the common point to the talker through the active channel. There will, nevertheless, be a certain amount of mismatch reflection from where the talker's line is connected to the channel of the conference amplifier.

Whereas the amplifier disclosed in the above patent specification is satisfactory in a number of major respects, it suffers from certain disadvantages, the first of which is that a talker whose signal is rather louder than those of other talkers, for example, by reason of his being located close at hand, may cause those on poorer lines to appear abnormally faint by comparison, so that they may be unable to contribute equally to the conference.

A second disadvantage of the amplifier disclosed in the above patent specification is that participants on poor lines are further put at a disadvantage because the speech detector has certain imperfections of operation at low input levels.

A third disadvantage of the amplifier disclosed in the above patent specification is that the change of transistor leakage with temperature gives to the channel of a participant who has just stopped talking an advantage in retaining control which increases with temperature. A certain amount of such advantage is desirable to allow for naturally occurring spaces in speech, but the increased advantage at elevated temperatures is not. It further mitigates against participants on poor lines talking over control during lulls in speech.

It is an object of the present invention to provide an improved telephone conference amplifier in which one or more of the above difficulties are at least partially alleviated.

According to one aspect of the present invention there is provided a telephone conference amplifier circuit having a plurality of channels, each for a respective participant, each channel including means for producing an envelope signal from an input signal, means for combining the envelope signal with the input signal to produce a unidirectional polarity signal, first individual unilaterally conducting means connected for applying the unidirectional polarity signal to a point common to all of the channels, second individual unilaterally conducting means connected to derive the unidirectional polarity signal from the common point, means for producing a symmetrically polarised output signal from the unidirectional polarity signal derived by the second unilaterally conducting means, and means responsive to the unidirectional polarity signal derived by the second unilaterally conducting means and inhibited by a signal related to the unidirectional polarity signal in the signal path to the common point to apply a voltage to the means for producing an envelope signal to reduce its sensitivity, whereby there is imposed a higher threshold dependent on said voltage to be overcome by a participant wishing to talk in a channel, other than the active channel previously carrying signals from a participant talking, wherein the combining means includes an automatic level control means for limiting the range of variation of amplitude of a speech waveform derived from the input signal before it is combined with the envelope signal to produce the unidirectional polarity signal which is applied to the common point, the automatic level control means not being effective on the envelope signal. The related signal may be the same as the signal applied to the common point or it may differ to the extent that the signal applied to the common point is subjected to automatic level control.

The automatic level control means may comprise variable gain means effective on the speech waveform derived from the input signal and controlled by the envelope signal. The variable gain means may include a field effect transistor driven into saturation as a variable resistance the value of which is controlled by the envelope signal.

The means responsive to the unidirectional polarity signal derived by the second unilaterally conducting means and inhibited by the unidirectional polarity signal in the signal path to the common point may include a transistor the base-emitter diode of which is part of the second unilaterally conducting means. The collector of the transistor may be connected to the means for receiving an input signal and producing a unidirectional polarity signal therefrom to reduce the sensitivity thereof. A separate means for combining the input signal and the envelope signal may be provided to produce a control signal which is applied to the base of the transistor so that a unidirectional polarity signal generated by the separate combining means tends to turn off the transistor.

According to a second aspect of the present invention there is provided a telephone conference amplifier circuit having a plurality of channels each for a respective participant, each channel including means for producing an envelope signal from an input signal, means for combining the envelope signal with the input signal to produce a unidirectional polarity signal, first individual unilaterally conducting means connected for applying the unidirectional polarity signal to a point common to all of the channels, second individual unilaterally conducting means connected to derive the unidirectional polarity signal from the common point, means for producing a symmetrically polarised output signal from the unidirectional polarity signal derived by the second unilaterally conducting means, and means responsive to the unidirectional polarity signal derived by the second unilaterally conducting means and inhibited by a signal related to the unidirectional polarity signal in the signal path to the common point, connected to apply a voltage to the means for producing an envelope signal to reduce its sensitivity, whereby the circuit imposes a higher threshold, dependent on the voltage, to be overcome by a participant wishing to talk in a channel other than an active channel previously carrying signals from a participant talking, wherein the means responsive to the unidirectional polarity signal derived by the second unilaterally conducting means and inhibited by a signal related to the unidirectional polarity signal in the signal path to the common point includes a transistor, the base-emitter diode of which is part of the second unilaterally conducting means, to the base of which the signal related to the unidirectional polarity signal in the signal path to the common point is applied and the collector of which is connected by a current path to the means for producing an envelope signal so that current through the collector tends to reduce the sensitivity thereof, there being provided a diode in the connection to the emitter so as substantially to eliminate reverse current leakage through the emitter-collector path of the transistor when it is non-conducting, a temperature sensitive resistor means connected to the collector from a connection of the first or a connection of the second unilaterally conducting means so as to provide a substantially constant current leakage to the current path with variation due to temperature in the voltage at the connection of the first or the connection the second unilaterally conducting means when the transistor is non-conducting.

The related signal may be the same as the unidirectional polarity signal in the signal path to the common point or it may differ from it if the signal applied to the common point is subjected to some form of automatic level control, for example.

In the above mentioned U.S. patent specification, the emitter-collector path of the transistor provides a leakage path providing part of a positive feedback loop tending to sustain an output from the means for receiving an input signal and producing a unidirectional polarity signal therefrom at times when there is no such input.

This positive feedback path includes the forward voltage drop across a semiconductor diode and some temperature compensation is therefore needed. The negative temperature coefficient of the collector-emitter resistance of this transistor may be used to give this temperature compensation but may overcompensate causing considerable changes in the threshold to be attained by a new talker to take control during the silent period following another talker. To avoid this, the invention provides a silicon diode connected in series with the emitter of the transistor to eliminate the leakage through the transistor and a substitute leakage path is provided by a negative temperature coefficient resistor.

The first and second unilaterally conducting means may both be ideal diode circuits, each having an inverting d.c. amplifier with two d.c. feedback paths respectively including diodes connected in opposite polarities to the output of the amplifier and one at least of the paths includes a resistor. Input to the circuit is through a resistor connected to the inverting input of the amplifier and the output from the circuit is taken from a feedback path containing a resistor at the junction of the diode and resistor. The temperature sensitive resistor means may be connected to the output of the amplifier of the second unilaterally conducting means or preferably to the output of the amplifier of the first unilaterally conducting means.

Figure 2:
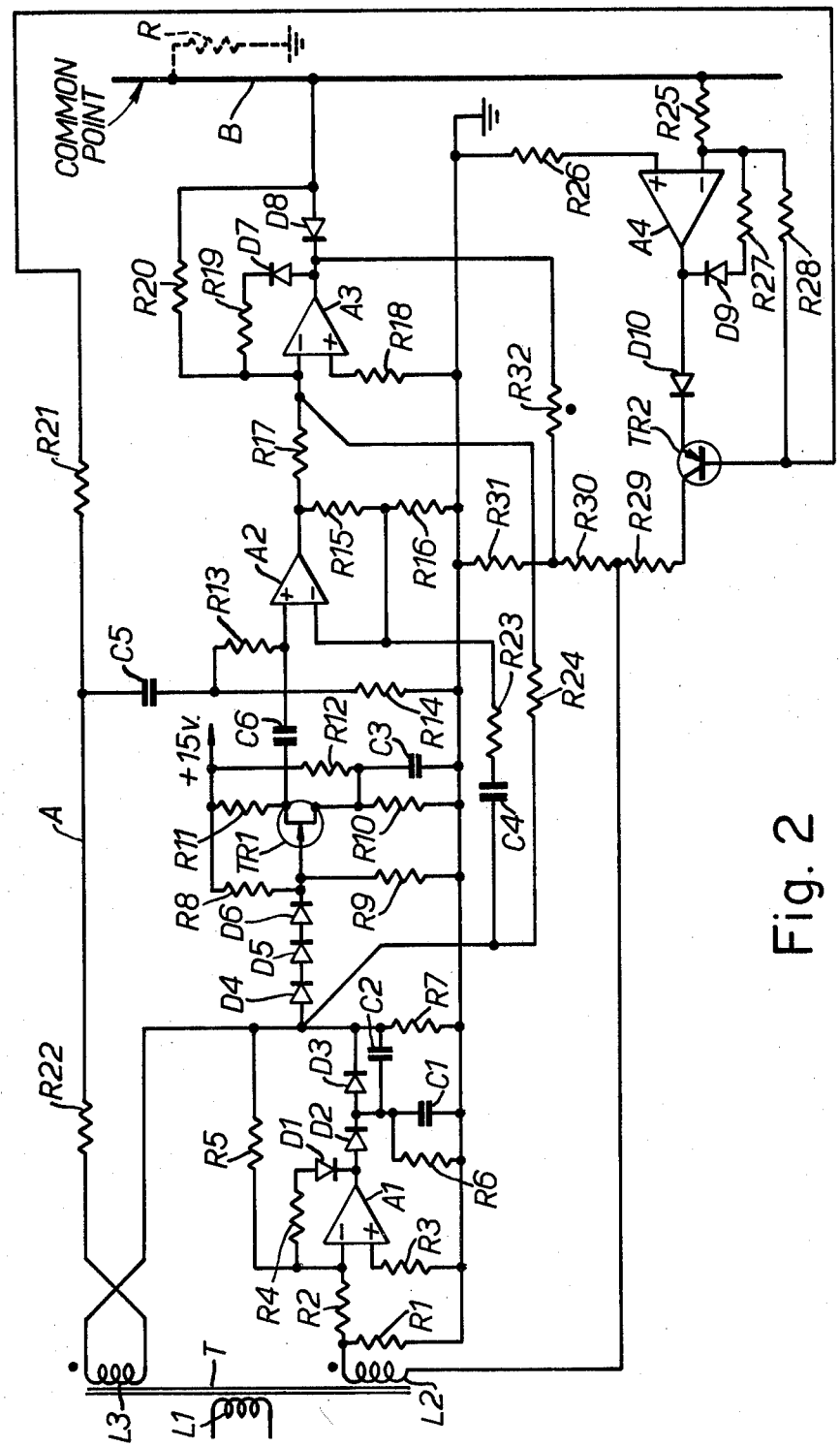

In order that the invention may be fully understood and readily carried into effect it will now be described with reference to the accompanying drawings, of which:

FIG. 1 shows in diagrammatic form the circuitry of one channel of a telephone conference amplifier according to an embodiment of the invention; and FIG. 2 shows a modified version of FIG. 1.

It is to be understood that each participant in the conference is provided with a circuit of the form shown in FIG. 1 or FIG. 2 of the drawings and the common point is common to all of those circuits.

Referring now to FIG. 1, a two-wire telephone line from the telephone instrument of a telephone conference participant is connected to a primary winding L1 of a transformer T. A first secondary winding L2 of the transformer T is connected at one end through a resistor R1 to earth and through a resistor R2 to the inverting input of a d.c. amplifier A1. The non-inverting input of the amplifier A1 is connected to earth through a resistor R3. A first negative feedback path for the amplifier A1 is provided by the diodes D2 and D3 in series with a resistor R5. The junction of the diodes D2 and D3 is connected to earth through a capacitor C1 shunted by a resistor R6. The diode D3 is shunted by a capacitor C2. The junction of the diode D3 and the resistor R5 from which the output of the amplifier A1 is obtained is connected to earth through a resistor R7, to an end terminal of a second secondary winding L3 of the transformer T, through diodes D4, D5 and D6 in series to the gate of a field effect transistor TR1, through a resistor R24 to the inverting input of an amplifier A3 and through a capacitor C4 in series with a resistor R23 to the inverting input of an amplifier A2. A second negative feedback path for the amplifier A1 is provided by diode D1 and resistor R4. A +15 volts supply line is connected through a resistor R8 to the gate of transistor TR1, through a resistor R11 to the drain of the transistor TR1 and through a resistor R12 in series with a capacitor C3 to earth. The gate of the transistor TR1 is connected to earth through a resistor R9 and its source to earth through a resistor R10. The source of TR1 is also connected to the junction of C3 and R12. The drain of the transistor TR1 is connected through a capacitor C6 to the non-inverting input of the amplifier A2, which input is also connected through a resistor R13 to the junction of a capacitor C5 and a resistor R14, which are connected in series from a conductor A to earth. The conductor A is connected through a resistor R22 to the winding L3 and through a resistor R21 to the base of a transistor TR2. The output of the amplifier A2 is connected through a resistor R17 to the inverting input of the amplifier A3 and through resistors R15 and R16 in series to earth. The junction of resistors R15 and R16 is connected to the inverting input of the amplifier A2. Two negative feedback paths respectively including a diode D7 in series with a resistor R19 and a diode D8 in series with a resistor R20 are provided for the amplifier A3. The junction of the diode D8 and the resistor R20 is connected to a conductor B which forms the common point for the conference amplifier circuit. The non-inverting input of the amplifier A3 is connected to earth through a resistor R18.

The conductor B is connected to the inverting input of an amplifier A4 through a resistor R25, the non-inverting input of which is connected to earth through a resistor R26. Two negative feedback paths are provided for the amplifier A4, the first including a diode D9 in series with a resistor R27 and the second including a diode D10 in series with the emitter-base diode of the transistor TR2 and a resistor R28. The collector of the transistor TR2 is connected to earth through resistors R29, R30 and R31 in series. The junction of resistors R29 and R30 is connected to the end of the winding L2 remote from its connection to the amplifier A1, and the junction of resistors R30 and R31 is connected through a negative temperature coefficient resistor R32 to the output of the amplifier A4 via a conductor Y.

FIG. 2, which is otherwise identical to FIG. 1, shows an alternative connection for resistor R32 via a conductor X to the output of the amplifier A3.

Basically the operation of the circuit described above is the same as that described in the above-mentioned patent specification and is as follows.

The incoming speech signal applied to the winding L1 is rectified by the amplifier A1 and the associated diodes which together form an ideal diode circuit, so that there is produced across the resistor R7 a voltage representing the envelope of the speech signal. The envelope signal is combined with the incoming speech waveform appearing across the winding L3 so that a unidirectional polarity signal is established on the conductor A. This signal is sometimes referred to as a unilateralised signal because it has one polarity only. Disregarding for the present the functions of the transistor TR1 and the amplifier A2, the unidirectional polarity signal is applied to the input of the amplifier A3 which is connected to operate as an ideal diode circuit so that the unidirectional polarity signal is applied to conductor B. The polarity of the unidirectional polarity signal in the example of the circuit shown is negative at B. In a channel other than the active channel the unidirectional polarity signal passes through the ideal diode circuit including the amplifier A4 and appears at the base electrode of the transistor TR2 from which it is applied via resistors R21 and R22 to the winding L3, the circuit for the a.c. component being completed through capacitors C1 and C2 in series. The d.c. component is returned to earth through the resistor R7. The speech waveform part of the unidirectional polarity signal is therefore induced in the winding L1 and forms the output signal of that particular channel. Part of the unidirectional polarity signal also appears across the resistors R29, R30 and R31 in series, so that a positive signal is applied to the lower end of the winding L2 to act as a threshold bias which opposes the operation of the ideal diode formed by the amplifier A1 and its associated components unless the input signal is sufficiently large to overcome the bias.

In the active channel the unidirectional polarity signal on the conductor A and applied to the base of the transistor TR2 prevents it conducting so that there is no signal returned to L3 and no positive signal applied to the lower end of the winding L2.

As thus far described the operation of the circuit is similar to that described in the above-mentioned patent specification. Consideration will now be given to the operation of the transistor TR1 and the amplifier A2. The envelope signal established across the resistor R7 is applied through diodes D4, D5 and D6 to the gate of the transistor TR1, and is effective to reduce the resistance of the source-drain path of the transistor TR1 only when the signal across the resistor R7 is, say, 2 volts positive with respect to the signal across R9 due to the threshold voltages of the diodes D4, D5 and D6. The transistor TR1 is maintained in a saturated condition by current flow from the 15 volts supply line through resistors R11 and R10. The resistance between the source and the drain of the transistor TR1 is therefore controlled by the envelope signal when it is sufficiently large and forms a potentiometer with the resistor R13; otherwise the resistance of the source-drain path of the transistor TR1 is fixed by the voltage set up by the potential divider formed by resistors R8 and R9 to a value at least ten times that of the resistor R13.

The speech waveform component of the unidirectional polarity signal on the conductor A is connected through the capacitor C5 and the resistor R13 to the non-inverting input of the amplifier A2, the capacitor C5 and resistor R14 forming a high pass filter having a cut-off at 150 Hz, the amplitude of the component applied to the amplifier A2 being controlled by the potentiometer formed by the resistor R13 and the source-drain path of the transistor TR1. Capacitors C3 and C6 limit the low frequency response of the controlled resistance formed by the source-drain path of the transistor TR1 so that components of the frequency of the envelope are not applied to the non-inverting input of the amplifier A2.

It will be apparent therefore that the gain of the signal path through the non-inverting input of the amplifier A2 is controlled by the envelope signal established across the resistor R7. The amplifier A2 operates simply as a buffer amplifier to apply the speech waveform of controlled amplitude through the resistor R17 to the amplifier A3. The envelope signal, the amplitude of which is not controlled, passes through the resistor R24 to the amplifier A3. It will be apparent therefore that at the input of the amplifier A3 the unidirectional polarity signal is reconstituted with the amplitude of the speech waveform component controlled by the amplitude of the envelope component.

The operation of the transistor TR1 is such that as the envelope component increases above a certain value so the speech waveform component is controlled so as to increase by a lesser amount, but the parameters of the circuit must be so chosen that the resultant signal remains of unidirectional polarity for a minimum value of input signal.

In the circuit described in the above-mentioned British patent, the resistor corresponding to R7 is shunted by a capacitor and the capacitor C2 is omitted. It was found with this circuit that the ideal diode circuit formed by the amplifier A1 and its associated components would operate erratically at certain low signal levels and certain frequencies, impairing detection efficiency at low levels. The trouble was found to be due to phase changes resulting from the presence of the capacitor shunting the resistor R7 which could result in positive feedback over the amplifier A1. With the capacitor C2 provided as shown in the accompanying drawing in place of the capacitor shunting the resistor R7 the maximum phase change which can occur is limited to 90°, so that positive feedback cannot be established over the amplifier A1. The function of the capacitor shunting the resistor R7 was to provide a path to earth for the speech waveform components when signals are flowing from the common point through the winding L3 to be induced in the winding L1; this path is still provided through the capacitor C1.

The removal of the capacitors shunting the resistor R2 unfortunately removes some of the filtering effect which this capacitor had on distorted signal components appearing at the output of the ideal diode including an amplifier A1. This distortion is corrected in the circuit shown by the provision of the capacitor C4 in series with the resistor R23 by which a proportion of the distorted components is applied in the opposite phase to the input of the amplifier A3, the phase inversion being provided by the amplifier A2. Further improvement in the efficiency of the detector at low signal levels was effected by changing diode D1 to a silicon component whilst retaining D2 and D3 as germanium ones.

In the telephone conference amplifier described in the above-mentioned patent the retention of control of the circuit by the talker of the active channel depends upon the forward voltage drop established across the diode D9 and the reverse leakage through the transistor TR2, if this is a germanium transistor, or the current through a shunt resistor connected in parallel with the emitter-collector path of the transistor if it is a silicon transistor. By retention of control is intended the ability of the circuit to maintain the threshold in the non-active channels during natural breaks in the speech in the active channel and also the ability to maintain unilateralisation of signals in the active channel at very low levels at which rectification is inefficient. In the previously proposed circuit with increase in temperature the voltage drop across the diode D9 falls and the leakage of the transistor TR2, if it is germanium rises. As affecting the voltage loss from the output of the amplifier A4 to the junction of R29, and R30, these effects compensate one another over a temperature range of 18 to 33° C, but above this range the rate of loss of switching sensitivity with increase of temperature due to the retention effect rising with temperature is too great to be acceptable.

In order to overcome this difficulty the silicon diode D10 is included and the negative temperature coefficient resistor R32 is provided as shown in the accompanying drawing connected either through the conductor Y to the output of the amplifier A4 or through the conductor X to the output of the amplifier A3, and whilst this does not keep the switching sensitivity completely constant it can be arranged to provide satisfactory performance. If the connection through the conductor X is used for the resistor R32 it is desirable that the diode D8 be selected as a silicon component; with this connection the voltage applied to that end of the resistor R32 is better defined because the signal voltage at the output of the amplifier A3 is greater than that at the output of the amplifier A4. If this latter connection is used it is desirable that when checking and setting up individual channels that the common point connection be loaded by a resistor R of 1 kΩ for example, to simulate the loading of the other channels when connected together at their common points. The accuracy with which the voltage at the output of the amplifier A3 is maintained after cessation of an input to winding L1 of transformer T depends on the maintenance of a forward current through the diode D8. If the transistor TR2 is a germanium transistor, some further improvement in performance can be obtained by shunting the diode D10 by a resistor of a suitable value.

Although the automatic level control has been described with reference to a circuit, which is otherwise very similar to that described in the above-mentioned U.S. patent, it could equally well be applied to other conference amplifiers in which, for example, the incoming and outgoing diode circuits including the amplifiers A3 and A4 respectively are replaced by a single toggle switching circuit which performs the same function.

We claim:

1. A telephone conference amplifier circuit having a plurality of channels each for a respective participant, each channel including means for producing an envelope signal from an input signal, means for combining the envelope signal with the input signal to produce a unidirectional polarity signal, first individual unilaterally conducting means connected for applying the unidirectional polarity signal to a point common to all of the channels, second individual unilaterally conducting means connected to derive the unidirectional polarity signal from the common point, means for producing a symmetrically polarised output signal from the unidirectional polarity signal derived by the second unilaterally conducting means and means responsive to the unidirectional polarity signal derived by the second unilaterally conducting means and inhibited by a signal related to the unidirectional polarity signal in the signal path to the common point to apply a voltage to the means for producing an envelope signal to reduce its sensitivity, whereby the circuit imposes a higher threshold, dependent on said voltage, to be overcome by a participant wishing to talk in a channel other than an active channel previously carrying signals from a participant talking, wherein the combining means includes an automatic level control means for limiting the range of variation of amplitude of a speech waveform derived from the input signal before it is combined with the envelope signal to produce the unidirectional polarity signal which is applied to the common point, the automatic level control means not being effective on the envelope signal.

2. A circuit according to claim 1 wherein the automatic level control means comprises variable gain means effective on the speech waveform derived from the input signal and controlled by the amplitude of the envelope signal, there being provided means for adding the speech waveform after control by the variable gain means to the envelope signal so as to produce a unidirectional polarity signal the range of variation of amplitude of which is limited.

3. A circuit according to claim 2 wherein the variable gain means includes a field effect transistor driven into saturation to the gate electrode of which the envelope signal is applied so as to control the resistance between source and drain of the transistor, the source-drain path being connected in a potentiometer circuit to which the speech waveform is applied.

4. A circuit according to claim 1 wherein the means responsive to the unidirectional polarity signal derived by the second unilaterally conducting means and inhibited by a signal related to the unidirectional polarity signal in the signal path to the common point includes a transistor the base emitter diode of which forms part of the second unilaterally conducting means, to the base of which the signal related to the unidirectional polarity signal in the signal path to the common point is applied and the collector of which is connected by a current path to the means for producing an envelope signal, so that current through the collector tends to reduce the sensitivity of that means, and temperature sensitive resistor means connected from the collector so as to tend to maintain constant with variation in temperature current leakage from the current path.

5. A circuit according to claim 4 wherein the related signal is the same as the unidirectional polarity signal in the signal path to the common point.

6. A circuit according to claim 4 wherein the related signal consists of the unidirectional polarity signal from the combining means.

7. A circuit according to claim 4 wherein the temperature sensitive resistor means provides a current which tends to increase the sensitivity of the means for producing an envelope signal.

8. A circuit according to claim 4 wherein the first and second unilaterally conducting means are both ideal diode circuits, each having an inverting d.c. amplifier with two d.c. feedback paths respectively including diodes connected in opposite polarities to the output of the amplifier and one at least of the paths includes a resistor, and the terminal of the temperature sensitive resistor means remote from the collector of the transistor is connected to the output of the amplifier in either said first or said second unilaterally conducting means.

9. A telephone conference amplifier circuit having a plurality of channels each for a respective participant, each channel including means for producing an envelope signal from an input signal, means for combining the envelope signal with the input signal to produce a unidirectional polarity signal, first individual unilaterally conducting means connected for applying the unidirectional polarity signal to a point common to all of the channels, second individual unilaterally conducting means connected to derive the unidirectional polarity signal from the common point, means for producing a symmetrically polarised output signal from the unidirectional polarity signal derived by the second unilaterally conducting means, and means responsive to the unidirectional polarity signal derived by the second unilaterally conducting means and inhibited by a signal related to the unidirectional polarity signal in the signal path to the common point connected to apply a voltage to the means for producing an envelope signal to reduce its sensitivity, whereby the circuit imposes a higher threshold, dependent on said voltage, to be overcome by a participant wishing to talk in a channel other than an active channel previously carrying signals from a participant talking, wherein the means responsive to the unidirectional polarity signal derived by the second unilaterally conducting means and inhibited by a signal related to the unidirectional polarity signal in the signal path to the common point includes a transistor the base-emitter diode of which is part of the second unilaterally conducting means, to the base of which the signal related to the unidirectional polarity signal in the signal path to the common point is applied and the collector of which is connected by a current path to the means for producing an envelope signal so that current through the collector tends to reduce the sensitivity thereof, there being provided a diode in the connection to the emitter so as to substantially eliminate reverse current leakage through the emitter-collector path of the transistor when it is non-conducting, and temperature sensitive resistor means connected to the collector from a connection of the first or a connection of the second unilaterally conducting means so as to provide a substantially constant current leakage to the current path with variation due to temperature in the voltage at the connection of the first or the connection of the second unilaterally conducting means when the transistor is non-conducting.

10. A circuit according to claim 9 wherein the related signal is the same as the unidirectional polarity signal in the signal path to the common point.

11. A circuit according to claim 9 wherein the related signal consists of the unidirectional polarity signal from the combining means.

12. A circuit according to claim 6 wherein the temperature sensitive resistor means provides a current which tends to increase the sensitivity of the means for producing an envelope signal.

13. A circuit according to claim 9 wherein the first and second unilaterally conducting means are both ideal diode circuits, each having an inverting d.c. amplifier with two d.c. feedback paths respectively including diodes connected in opposite polarities to the output of the amplifier and one at least of the paths includes a resistor, and the terminal of the temperature sensitive resistor means remote from the collector of the transistor is connected to the output of the amplifier in either said first or said second unilaterally conducting means.

* * * * *